(12) United States Patent
Morioka

(10) Patent No.: US 11,480,216 B2
(45) Date of Patent: Oct. 25, 2022

(54) ALUMINUM ALLOY FOR SLIDE BEARING, AND SLIDE BEARING

(71) Applicant: TAIHO KOGYO CO., LTD., Toyota (JP)

(72) Inventor: Ryuichi Morioka, Toyota (JP)

(73) Assignee: TAIHO KOGYO CO., LTD., Toyota (JP)

(*) Notice: Subject to any disclaimer, the term of this patent is extended or adjusted under 35 U.S.C. 154(b) by 0 days.

(21) Appl. No.: 17/422,603

(22) PCT Filed: Sep. 19, 2019

(86) PCT No.: PCT/JP2019/036771
§ 371 (c)(1),
(2) Date: Jul. 13, 2021

(87) PCT Pub. No.: WO2020/166118
PCT Pub. Date: Aug. 20, 2020

(65) Prior Publication Data
US 2022/0042544 A1 Feb. 10, 2022

(30) Foreign Application Priority Data

Feb. 15, 2019 (JP) .............................. JP2019-025552

(51) Int. Cl.
*C10M 103/00* (2006.01)
*F16C 33/10* (2006.01)
(Continued)

(52) U.S. Cl.
CPC ....... *F16C 33/1095* (2013.01); *C10M 103/04* (2013.01); *C22C 21/003* (2013.01);
(Continued)

(58) Field of Classification Search
CPC .. F16C 33/1095; F16C 17/02; F16C 2204/20; C10M 103/04; C10M 2201/053; C22C 21/003; C10N 2040/02
See application file for complete search history.

(56) References Cited

FOREIGN PATENT DOCUMENTS

| CN | 101201081 A | 6/2008 |
|---|---|---|
| CN | 102869800 A | 1/2013 |

(Continued)

OTHER PUBLICATIONS

International Search Report of PCT/JP2019/036771 dated Dec. 17, 2019 [PCT/ISA/210].

(Continued)

*Primary Examiner* — Taiwo Oladapo
(74) *Attorney, Agent, or Firm* — Sughrue Mion, PLLC

(57) ABSTRACT

An aluminum alloy for a slide bearing of the present invention contains: 0 mass % or more and 10.0 mass % or less of Sn and 0 mass % or more and 5.0 mass % or less of Si, 0 mass % or more and 2.0 mass % or less of Cu as a solid-solution strengthening component, at least one of 0.05 mass % or more and 0.35 mass % or less of Cr, 0.05 mass % or more and 1.5 mass % or less of Mn, and 0.05 mass % or more and 0.3 mass % or less of Zr as a precipitation strengthening component, 2.3 mass % or more and 6.0 mass % or less of Ag, a part of which is dissolved to form a solid solution and the rest of which is precipitated, and the balance consisting of unavoidable impurities and Al.

12 Claims, 4 Drawing Sheets

(51) Int. Cl.
  *C10M 103/04* (2006.01)
  *C22C 21/00* (2006.01)
  *F16C 17/02* (2006.01)
  *C10N 40/02* (2006.01)

(52) U.S. Cl.
  CPC ....... *F16C 17/02* (2013.01); *C10M 2201/053* (2013.01); *C10N 2040/02* (2013.01); *F16C 2204/20* (2013.01)

(56) References Cited

FOREIGN PATENT DOCUMENTS

| CN | 105051226 | A | 11/2015 | | |
|----|-----------|---|---------|---|---|
| JP | 52-38414 | A | 3/1977 | | |
| JP | 55-51019 | B2 | 12/1980 | | |
| JP | 2007-16275 | A | 1/2007 | | |
| JP | 2015-172215 | A | 10/2015 | | |
| JP | 2015172215 | A | * 10/2015 | | |
| WO | 2014/157650 | A1 | 10/2014 | | |
| WO | WO-2014157650 | A1 | * 10/2014 | ............. | B32B 15/01 |

OTHER PUBLICATIONS

Written Opinion of PCT/JP2019/036771 dated Dec. 17, 2019 [PCT/ISA/237].
International Preliminary Report on Patentability of PCT/JP2019/036771 dated Jul. 13, 2020 [PCT/IPEA/409].
Communication dated Nov. 24, 2021 from the China National Intellectual Property Administration in Chinese Application No. 201980091044.0.
Office Action dated Apr. 26, 2022 in Japanese Application No. 2019-025552.

* cited by examiner

ALUMINUM ALLOY FOR SLIDE BEARING, AND SLIDE BEARING

CROSS REFERENCE TO RELATED APPLICATIONS

This application is a National Stage of International Application No. PCT/JP2019/036771, filed Sep. 19, 2019, claiming priority to Japanese Patent Application No. 2019-025552, filed Feb. 15, 2019.

TECHNICAL FIELD

The present invention relates to an aluminum alloy for a slide bearing, and a slide bearing.

BACKGROUND ART

An aluminum alloy for a slide bearing is known, which contains Mg, Ag, and Cu as solid-solution strengthening components, at least one of Cr, Mn, and Zr as a precipitation strengthening component, and the balance consisting of unavoidable impurities and Al (see Patent Literature 1). In Patent Literature 1, since the alloy can be strengthened by solid solution strengthening, a content of hard particles can be suppressed. As a result, frictional heat in the hard particles can be suppressed, and seizure resistance can be improved.

CITATIONS LIST

Patent Literature

Patent Literature 1: JP 2015-172215 A

SUMMARY OF INVENTION

Technical Problems

However, Patent Literature 1 involves a problem that adhesion to a counter shaft occurs in a conforming process. In addition, there is a problem that seizure resistance is deteriorated due to occurrence of adhesion.

The present invention has been made in view of the above problems, and an object thereof is to provide a technique capable of reducing occurrence of adhesion.

Solutions to Problems

In order to achieve the above object, an aluminum alloy for a slide bearing and a slide bearing of the present invention each contain:

0 mass % or more and 10.0 mass % or less of Sn and 0 mass % or more and 5.0 mass % or less of Si, 0 mass % or more and 2.0 mass % or less of Cu as a solid-solution strengthening component, at least one of 0.05 mass % or more and 0.35 mass % or less of Cr, 0.05 mass % or more and 1.5 mass % or less of Mn, and 0.05 mass % or more and 0.3 mass % or less of Zr as a precipitation strengthening component, Ag in a larger amount than a solid solubility limit, and the balance consisting of unavoidable impurities and Al.

In the present invention configured as described above, a part of Ag is dissolved to form a solid solution and the rest thereof is precipitated. Ag$_2$S (silver sulfide) can be formed on a sliding surface by combining the precipitated Ag with S contained in a lubricating oil. The Ag$_2$S is thinly extended on the sliding surface, thereby making it possible to reduce frictional resistance and to improve non-adhesiveness. In particular, since Ag$_2$S is easily formed at a portion heated to a high temperature by frictional heat, seizure can be effectively reduced (see JP 3274261 B).

Since a part of Ag that has not been precipitated functions as a solid-solution strengthening component, the hardness of the aluminum alloy for a bearing can be increased. Furthermore, the precipitation strengthening component is composed of at least one of 0.05 mass % or more and 0.35 mass % or less of Cr, 0.05 mass % or more and 1.5 mass % or less of Mn, and 0.05 mass % or more and 0.3 mass % or less of Zr, and a compound or alloy containing the elements is precipitated as a hard phase in the matrix, whereby the hardness of the aluminum alloy for a bearing can be increased.

Sn may be optionally contained in a range of 10.0 mass % or less, and conformability and non-adhesiveness can be improved by Sn. In addition, Si may be optionally contained in a range of 5.0 mass % or less, and hard particles containing Si may be produced. Further, Cu may be optionally contained in a range of 2.0 mass % or less, or Cu may be contained as the solid-solution strengthening component together with Ag.

DESCRIPTION OF EMBODIMENTS

Figure 1:
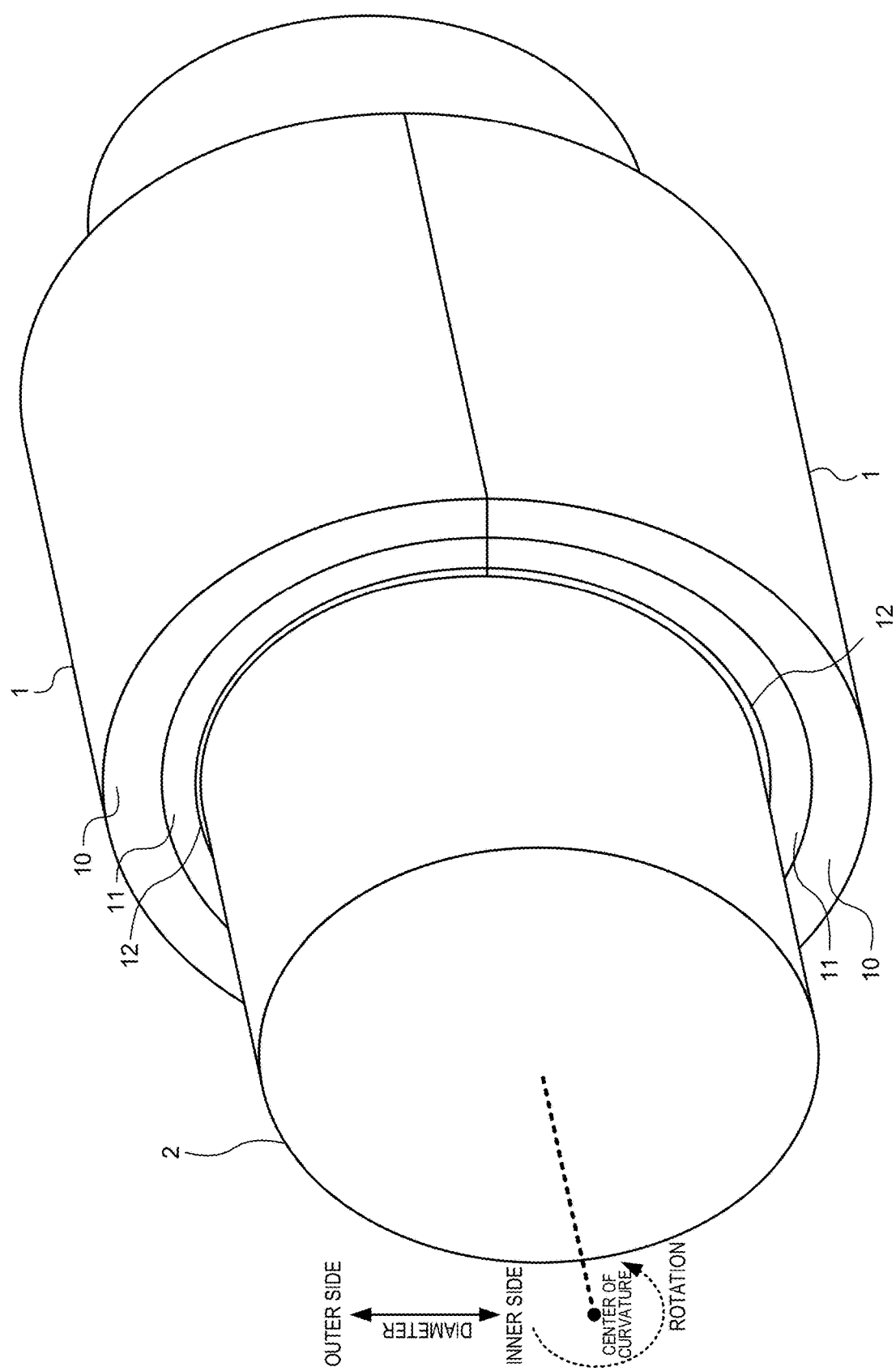
FIG. 1 is a perspective view of a slide bearing.

Embodiments of the present invention will be described in the following order.
(1) Structure of slide bearing:
(2) Method for manufacturing slide bearing:
(3) Experimental result:
(4) Other embodiments:
(1) Structure of slide bearing FIG. 1 is a perspective view of a slide bearing 1 according to one embodiment of the present invention. The slide bearing 1 includes a back metal 10, an intermediate layer 11, and a lining 12. The slide bearing 1 is a half-shaped metallic member obtained by dividing a cylinder into two equal parts in a diametrical direction, and has a semicircular arc shape in cross section. The two slide bearings 1 combined into a cylindrical shape are attached to a connecting rod of an engine for an automobile. A crankshaft as a counter shaft 2 (dot-hatched) is borne in a columnar hollow portion formed by combining the two slide bearings 1. An outer diameter of the counter shaft 2 is formed to be slightly smaller than an inner diameter of the slide bearing 1. A lubricating oil (engine oil) is supplied to a gap formed between an outer peripheral surface of the counter shaft 2 and an inner peripheral surface of the slide bearing 1. The counter shaft 2 rotates about a rotation axis coinciding with a center of curvature of the slide bearing 1. At that time, the outer peripheral surface of the counter shaft 2 slides on the inner peripheral surface of the slide bearing 1.

The slide bearing 1 has a structure in which the back metal 10, the intermediate layer 11, and the lining 12 are laminated in an order of being distant from the center of curvature. Thus, the back metal 10 constitutes an outermost layer of the slide bearing 1, and the lining 12 constitutes an innermost layer of the slide bearing 1. The back metal 10, the intermediate layer 11, and the lining 12 each have a constant thickness in a circumferential direction. The back metal 10 has a thickness of 2 mm, the intermediate layer 11 has a thickness of 0.05 mm, and the lining 12 has a thickness of 0.35 mm. A radius of a surface on a curvature center side of the lining 12 (the inner diameter of the slide bearing 1) is 50 mm.

A shape of the slide bearing 1 may be determined according to shapes of the connecting rod, the counter shaft 2 and the like. A width of the slide bearing 1 may be any value ranging from 10 to 300 mm, an outer diameter of the slide bearing 1 may be any value ranging from 25 to 1000 mm, and a thickness of the entire slide bearing 1 may be any value ranging from 0.5 to 18 mm. A thickness of the lining 12 may be any value ranging from 0.05 to 10 mm, and a thickness of the intermediate layer 11 may be any value ranging from 0.01 to 2 mm. Hereinafter, the term "inner side" means a curvature center side of the slide bearing 1, and the term "outer side" means a side opposite to the center of curvature of the slide bearing 1. An inner surface of the lining 12 constitutes the sliding surface for the counter shaft 2.

The back metal 10 is formed of low-carbon steel containing 0.15 mass % of C, 0.06 mass % of Mn, and the balance consisting of Fe and unavoidable impurities. It suffices that the back metal 10 is formed of a material that can support a load from the counter shaft 2 via the lining 12, and the back metal 10 may not necessarily be formed of steel.

The intermediate layer 11 is a layer laminated on an inner side of the back metal 10 and on an outer side of the lining 12. The intermediate layer 11 is formed of an aluminum alloy. Specifically, the intermediate layer 11 is formed of an aluminum alloy containing 3 mass % of Cu, 0.1 mass % of Zr, and the balance consisting of Al and unavoidable impurities.

The lining 12 is a layer laminated on an inner side of the intermediate layer 11, and is formed of the aluminum alloy for a slide bearing of the present invention. That is, the lining 12 is formed by molding the aluminum alloy for a slide bearing of the present invention.

The lining 12 contains 7.0 mass % of Sn, 1.0 mass % of Si, 1.5 mass % of Cu, 1.1 mass % of Mn, 3.0 mass % of Ag, and the balance consisting of Al and unavoidable impurities. The unavoidable impurities of the lining 12 are Zn, V, Fe, Ti, B, and the like, and are impurities mixed in refining or scrapping. A content of the unavoidable impurities is 0.5 mass % or less as a whole. Masses of the elements constituting each of the layers of the slide bearing 1 were measured by an ICP emission spectroscopic analyzer (ICPS-8100 manufactured by Shimadzu Corporation).

In the lining 12, Sn is dispersed as a soft material, and can improve conformability. In the lining 12, Si alone constitutes a hard material, and can improve wear resistance. In the lining 12, Cu is dissolved in the matrix to form a solid solution, and functions as the solid-solution strengthening component. In the lining 12, Mn is precipitated as an Al—Mn compound, and functions as the precipitation strengthening component. In the lining 12, a part of Ag is precipitated alone, and a part of the rest thereof is dissolved in the matrix to form a solid solution and functions as the solid-solution strengthening component.

FIGS. 2A to 2F each show a distribution of each alloy element on the surface (sliding surface) of the lining 12 after a seizure test. FIGS. 2A to 2F are images obtained by imaging the same observation region on the lining 12, and the brighter the color, the higher the concentration of the corresponding alloy element.

The seizure test was performed by relatively moving the lining 12 and a contact member (hardened steel) in a state where the contact member was in contact with the lining 12. A normal load acting between the contact member and the lining 12 was stepped up by 3 kN to a maximum of 45 kN. A retention time for each step was set to 3 minutes and an overall test time was set to 15 minutes. In addition, the lining 12 was rotationally moved so that a relative moving speed between the contact member and the lining 12 was 20 m/min. In the seizure test, engine oil (0W-20) at 140° C. was supplied to a contact portion between the lining 12 and the contact member.

As shown in FIGS. 2A to 2F, Ag is distributed at a location where the alloy elements (Sn, Si, Cu, and Mn), other than Ag and Al, contained in the lining 12 are not present. Therefore, it can be understood that a part of Ag was precipitated alone in the lining 12. Further, Ag and S are both distributed at a location indicated by an arrow T1 in FIGS. 2C and 2E. From this, it can be understood that $Ag_2S$ (silver sulfide) was formed by combining Ag precipitated on the sliding surface with S contained in the lubricating oil in the seizure test.

Figure 2A:
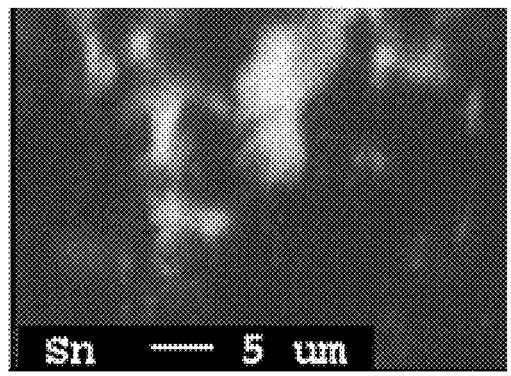
FIGS. 2A to 2F are photographs of a sliding surface after a seizure test.
Figure 2B:
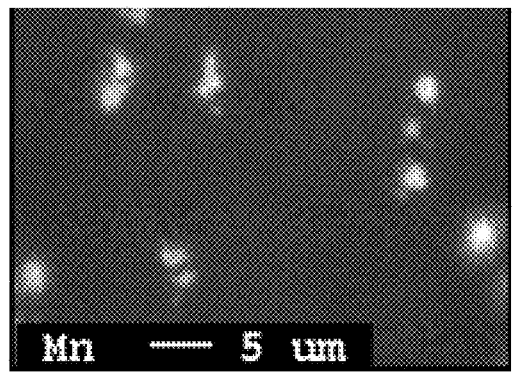
Figure 2C:
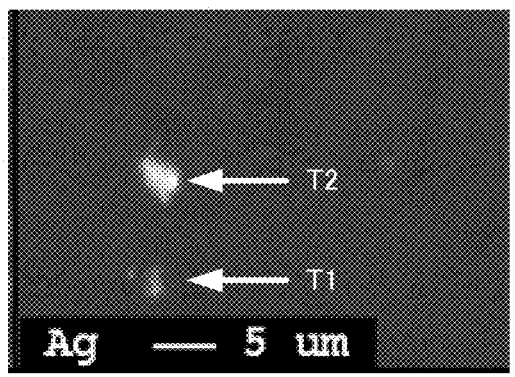
Figure 2D:
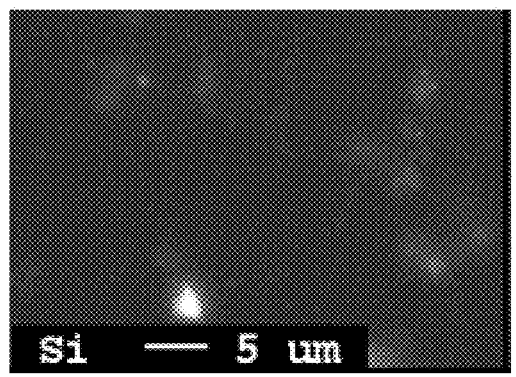
Figure 2E:
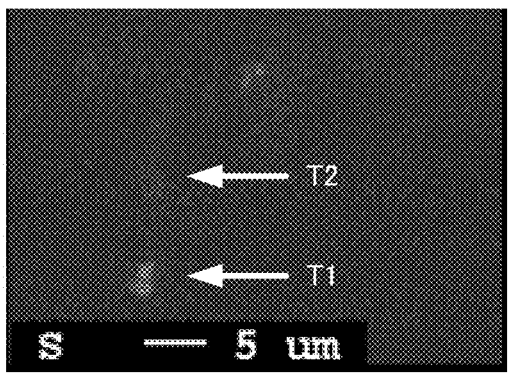
Figure 2F:
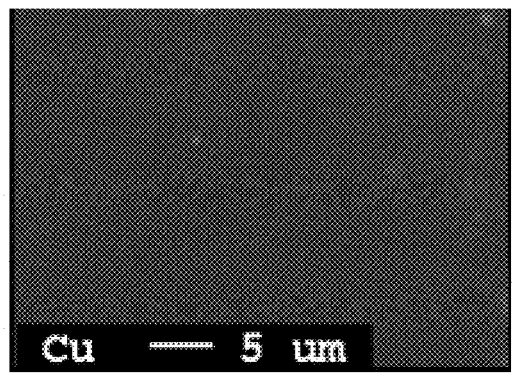

$Ag_2S$ is easily formed at a portion heated to a high temperature by frictional heat. Even in a portion where Ag is precipitated, it is considered that $Ag_2S$ is not formed at a location where generation of frictional heat is suppressed. In FIG. 2C, Ag is distributed at a location indicated by arrow T2, but in FIG. 2E, distribution of S is not observed at the location indicated by arrow T2. It is considered that, since the location indicated by the arrow T2 was close to soft Sn, generation of frictional heat was suppressed, and thus that $Ag_2S$ was not formed. On the other hand, at the portion indicated by the arrow T1, it is considered that the generation of frictional heat was promoted because it was close to Si as hard particles, and thus that $Ag_2S$ was formed.

In the embodiment described above, a part of Ag in the lining 12 is dissolved to form a solid solution, and the rest thereof is precipitated. $Ag_2S$ (silver sulfide) can be formed on a sliding surface by combining the precipitated Ag with S contained in a lubricating oil. The $Ag_2S$ is thinly extended on the sliding surface, thereby making it possible to reduce frictional resistance and to improve non-adhesiveness. In particular, since $Ag_2S$ is easily formed at a portion heated to a high temperature by frictional heat, seizure can be effectively reduced.

In the present embodiment, $Ag_2S$ can be formed on the sliding surface at a location where soft Sn does not exist and hard Si exists, that is, a location where frictional heat is likely to occur and seizure is likely to occur. Since a part of Ag that has not been precipitated functions as the solid-solution strengthening component, the hardness of the lining 12 can be increased.

(2) Method for Manufacturing Slide Bearing

In the present embodiment, the slide bearing 1 is manufactured by sequentially performing the steps of a. melting, b. continuous casting, c. cold rolling, d. natural cooling, e. cutting, and f. machining.

The respective steps will be described below.

a. Melting

First, ingots formed of elements are weighed and prepared such that an amount of Sn is 7.0 mass %, an amount of Si is 1.0 mass %, an amount of Cu is 1.5 mass %, an amount of Mn is 1.1 mass %, an amount of Ag is 3.0 mass %, and the balance Al. Each ingot was then heated to 850° C. by means of a high-frequency induction furnace. As a result, a molten material of the lining 12 is formed. Thereafter, bubbles of Ar gas were dispersed and ejected to remove hydrogen gas and inclusions.

b. Continuous Casting

Next, the molten material of the lining 12 is injected into a mold, and the molten material of the lining 12 is pulled out from an opening of the mold in a casting direction to form a continuously-cast sheet of the lining 12. A thickness of the continuously-cast sheet of the lining 12 formed by continuous casting was set to 3 to 20 mm.

(3) Experimental Result

Figure 3A:
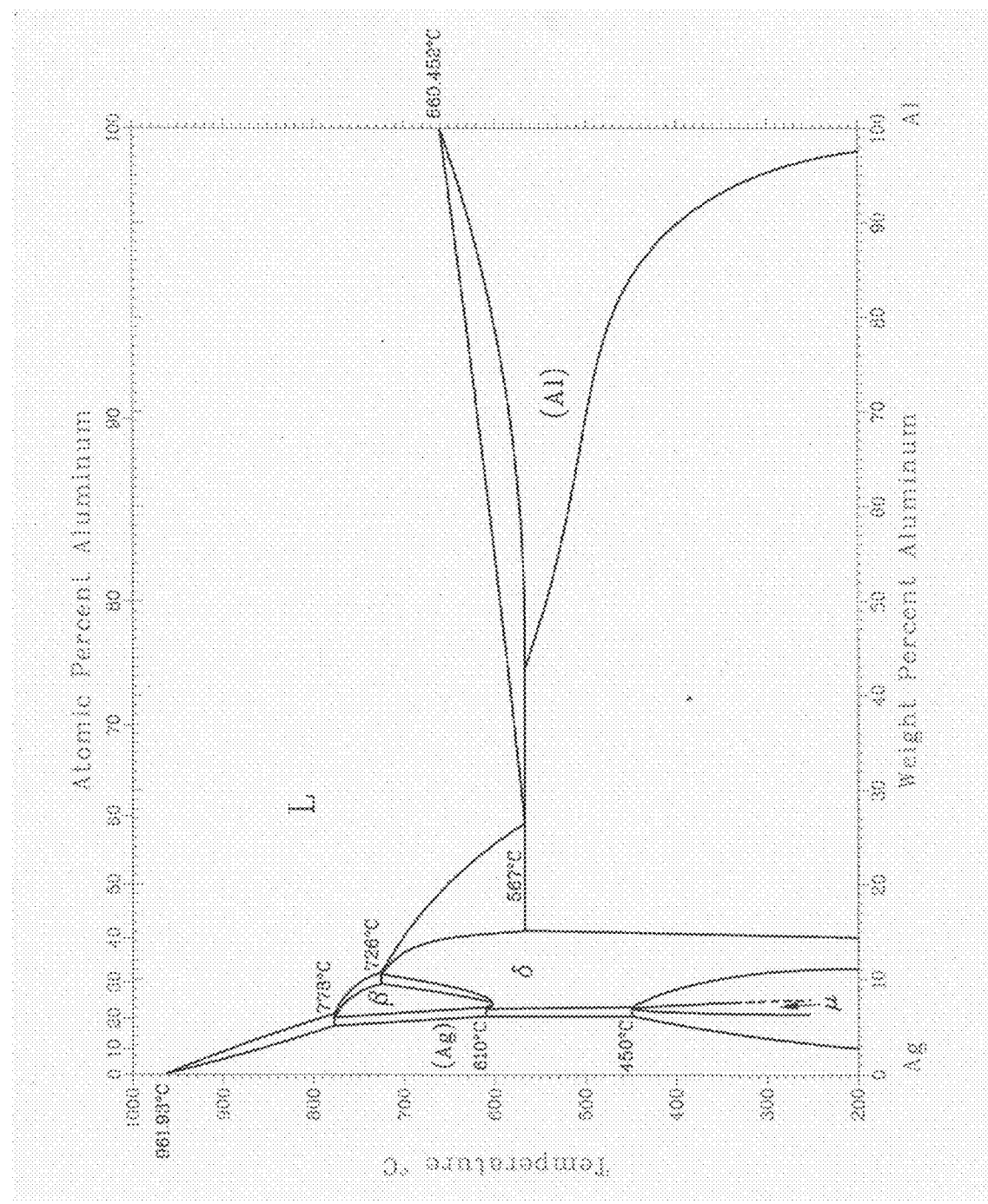
FIG. 3A is a phase diagram of an Al—Ag.

FIG. 3A is a phase diagram of Al—Ag. From the phase diagram in this figure, it can be understood that, in the Al—Ag alloy, when a content of Ag is less than 2.3 mass %, the entire amount of Ag is dissolved in Al to form a solid solution, and, when the content of Ag is 2.3 mass % or more, the entire amount of Ag cannot be dissolved in Al to form a solid solution, and a part thereof is precipitated. Briefly, it can be understood that 2.3 mass % is a lower limit value of the content of Ag that can be precipitated alone.

TABLE 1

| | Solid-solution strengthening component | | Precipitation strengthening component | | | | | Precipitation of Ag |
|---|---|---|---|---|---|---|---|---|---|
| | Sn | Si | Cu | Cr | Mn | Zr | Ag | Al | alone |
| Sample 1 | 7 mass % | 1 mass % | 1.5 mass % | 0 mass % | 1.1 mass % | 0 mass % | 3 mass % | Balance | Precipitated |
| Sample 2 | 0 mass % | 0 mass % | 0 mass % | 0 mass % | 0 mass % | 0 mass% | 2.3 mass % | Balance | Precipitated |
| Sample 3 | 7 mass % | 5 mass % | 2 mass % | 0.35 mass % | 1.5 mass % | 0.3 mass % | 4 mass % | Balance | Precipitated | c. Cold Rolling

Next, the continuously-cast sheet of the lining 12 is cold-rolled until the thickness of the lining 12 is reached. In this cold rolling, work hardening is prevented by repeatedly performing annealing in a range of 325 to 375° C. The continuously-cast sheet of the lining 12 may not necessarily be rolled by cold rolling, but may be rolled by hot rolling. In addition, together with the continuously-cast sheet of the lining 12, an aluminum alloy sheet of the intermediate layer 11 is cold-rolled to pressure-bond (adhere) the continuously-cast sheet of the lining 12 and the aluminum alloy sheet of the intermediate layer 11. The aluminum alloy sheet of the intermediate layer 11 was manufactured by performing continuous casting and rolling in the same manner as the continuously-cast sheet of the lining 12. Furthermore, a low-carbon steel sheet (commercial product) of the back metal 10 was also cold-rolled to pressure-bond the low-carbon steel sheet of the back metal 10 to the aluminum alloy sheet side of the intermediate layer 11. By the above operations, a rolled sheet of the slide bearing 1 in which the continuously-cast sheet of the lining 12, the aluminum alloy sheet of the intermediate layer 11, and the low-carbon steel sheet of the back metal 10 were pressure-bonded was formed.

d. Natural Cooling

Next, the rolled sheet of the slide bearing 1 is left at room temperature and naturally cooled.

e. Cutting

Next, the rolled sheet of the slide bearing 1 is cut into pieces of a predetermined size. The predetermined size is a size at which the slide bearing 1 can be formed by performing machining described later, and which is determined according to a shape of the connecting rod to which the slide bearing 1 is attached.

f. Machining

Finally, the rolled sheet of the slide bearing 1 after cutting is pressed to form the slide bearing 1 having a half-split shape. Furthermore, the slide bearing 1 is completed by finishing the shape and surface condition through cutting.

Table 1 is a table showing results of confirming whether or not Ag was precipitated alone for Samples 1 to 3. Sample 1 is the same as the first embodiment in terms of the lining 12, and Ag could be confirmed to be precipitated alone.

Figure 3B:
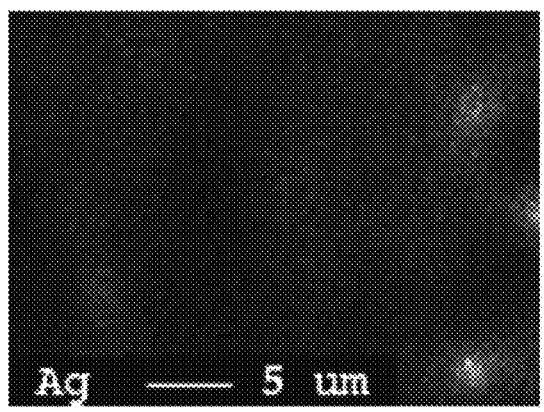
FIGS. 3B and 3C are photographs of the sliding surface after the seizure test.

Sample 2 is a sample in which a content of Cu that is dissolved, together with Ag, in Al to form a solid solution is 0 mass %, and the content of Ag is suppressed to 2.3 mass %, which is the lower limit value of the content of Ag that can be precipitated alone. In Sample 2, since the component dissolved in Al to form a solid solution is only Ag, it can be said that Ag is the alloy composition which is most easily dissolved to form a solid solution. Also in such Sample 2, Ag could be confirmed to be precipitated alone on the surface of the lining 12, as shown in FIG. 3B. Therefore, it is considered that Ag is precipitated alone in the alloy composition of the present invention in which the content of Ag is 2.3 mass % or more.

Figure 3C:
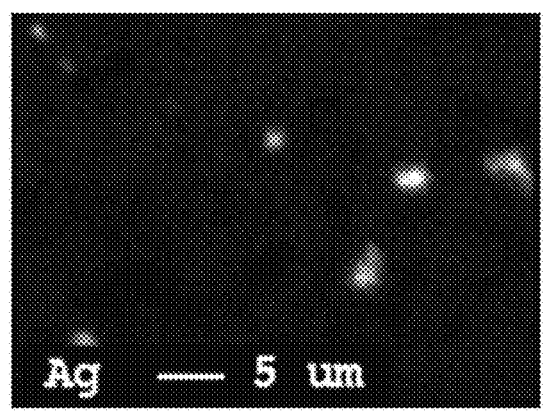

Sample 3 is a sample containing Cr, Mn, and Zr as the precipitation strengthening components up to the upper limit values of the ranges of the present invention. Since Sample 3 has the largest amount of a precipitate containing Cr, Mn, and Zr, it can be said that Sample 3 has an alloy composition in which Ag is most hardly precipitated. Also in such Sample 3, Ag could be confirmed to be precipitated alone on the surface of the lining 12, as shown in FIG. 3C. Therefore, it is considered that Ag is precipitated alone in the alloy composition of the present invention in which the contents of Cr, Mn, and Zr are equal to or less than the contents thereof in Sample 3.

(4) Other Embodiments

In the above embodiment, the slide bearing 1 formed of the aluminum alloy for a slide bearing of the present invention is used as the connecting rod, but the intended use of the slide bearing 1 is not limited to the connecting rod. For example, a thrust bearing may be formed of the aluminum alloy for a slide bearing of the present invention. In the slide bearing 1, an overlay may be formed on the lining 12, and the overlay may be a metal layer or a resin layer.

REFERENCE SIGNS LIST

1 Slide bearing
2 Counter shaft

10 Back metal
11 Intermediate layer
12 Lining

The invention claimed is:

1. An aluminum alloy for a slide bearing, comprising:
more than 0 mass % and 10.0 mass % or less of Sn and more than 0 mass % and 5.0 mass % or less of Si;
0 mass % or more and 2.0 mass % or less of Cu as a solid-solution strengthening component;
1.1 mass % or more and 1.5 mass % or less of Mn;
2.3 mass % or more and 6.0 mass % or less of Ag, a part of which is dissolved to form a solid solution and the rest of which is precipitated; and
Al.

2. A slide bearing, comprising:
an aluminum alloy layer, comprising:
more than 0 mass % and 10.0 mass % or less of Sn and more than 0 mass % and 5.0 mass % or less of Si;
0 mass % or more and 2.0 mass % or less of Cu as a solid-solution strengthening component;
1.1 mass % or more and 1.5 mass % or less of Mn;
2.3 mass % or more and 6.0 mass % or less of Ag, a part of which is dissolved to form a solid solution and the rest of which is precipitated; and
Al.

3. An aluminum alloy for a slide bearing, comprising:
more than 0 mass % and 10.0 mass % or less of Sn and more than 0 mass % and 5.0 mass % or less of Si;
more than 0 mass % and 2.0 mass % or less of Cu as a solid-solution strengthening component;
1.1 mass % or more and 1.5 mass % or less of Mn;
2.3 mass % or more and 6.0 mass % or less of Ag, a part of which is dissolved to form a solid solution and the rest of which is precipitated; and
Al.

4. A slide bearing, comprising an aluminum alloy layer including the aluminum alloy according to claim 3.

5. The aluminum alloy according to claim 1, wherein the aluminum alloy is used in a lubricating oil containing S.

6. The slide bearing according to claim 2, wherein the aluminum alloy is used in a lubricating oil containing S.

7. The aluminum alloy according to claim 3, wherein the aluminum alloy is used in a lubricating oil containing S.

8. The slide bearing according to claim 4, wherein the aluminum alloy is used in a lubricating oil containing S.

9. The aluminum alloy according to claim 5, further comprising at least one of 0.05 mass % or more and 0.35 mass % or less of Cr, and 0.05 mass % or more and 0.3 mass % or less of Zr as a precipitation strengthening component.

10. The slide bearing according to claim 6, wherein the aluminum alloy further comprises at least one of 0.05 mass % or more and 0.35 mass % or less of Cr, and 0.05 mass % or more and 0.3 mass % or less of Zr as a precipitation strengthening component.

11. The aluminum alloy according to claim 7, further comprising at least one of 0.05 mass % or more and 0.35 mass % or less of Cr, and 0.05 mass % or more and 0.3 mass % or less of Zr as a precipitation strengthening component.

12. The slide bearing according to claim 8, wherein the aluminum alloy further comprises at least one of 0.05 mass % or more and 0.35 mass % or less of Cr, and 0.05 mass % or more and 0.3 mass % or less of Zr as a precipitation strengthening component.

* * * * *